United States Patent

[11] 3,563,331

| [72] | Inventors | Takaaki Kato<br>Toyohashi-shi;<br>Kenji Takeshita, Kariya-shi, Japan |
|---|---|---|
| [21] | Appl. No. | 760,947 |
| [22] | Filed | Sept. 19, 1968 |
| [45] | Patented | Feb. 16, 1971 |
| [73] | Assignee | Nippon Denso Company Limited,<br>Kariya-shi, Japan<br>a corporation of Japan |
| [32] | Priority | Dec. 27, 1967 |
| [33] | | Japan |
| [31] | | 42/83648 |

[54] APPARATUS FOR AUTOMATICALLY RUNNING AUTOMOTIVE VEHICLES AT A SET SPEED
3 Claims, 2 Drawing Figs.

[52] U.S. Cl. .......................................................... 180/105;
123/102
[51] Int. Cl. ...................................................... B60k 31/00
[50] Field of Search ........................................... 180/105-
—110; 123/102

[56] References Cited
UNITED STATES PATENTS

| 3,116,807 | 1/1964 | Wilson | 123/102X |
|---|---|---|---|
| 3,172,497 | 3/1965 | Stoner et al. | 123/102X |
| 3,207,255 | 9/1965 | Hahlganss et al. | 180/105 |
| 3,344,880 | 10/1967 | Iwashita et al. | 180/109 |
| 3,368,640 | 2/1968 | Bremer et al. | 180/108 |
| 3,409,102 | 11/1968 | Neapolitakis et al. | 180/109 |
| 3,439,770 | 4/1969 | Saito | 180/105 |
| 3,455,411 | 7/1969 | Carp et al. | 180/109 |

*Primary Examiner*—Kenneth H. Betts
*Attorney*—Cushman, Darby and Cushman

ABSTRACT: An apparatus for automatically running an automotive vehicle at a set speed, which is so designed that the speed of the vehicle running at a set speed can be accelerated or decelerated temporarily optionally without releasing the speed control system, said apparatus including two self-restoring switches located in the driver's cabin, one of said switches being inserted in an electric control circuit in such a manner that in a closed position of the switch a signal is given to the speed control system, which always causes the speed of the vehicle to be apparently lower than the set speed independently of the actual speed of the vehicle and the set speed, and another one of said switches being inserted in the electric control circuit in such a manner that in a closed position of the switch a signal is given to the speed control system, which always causes the speed of the vehicle to be apparently higher than the set speed independently of the actual speed of the vehicle and the set speed.

Patented Feb. 16, 1971

3,563,331

INVENTORS
Takaaki Kato
Kenji Takeshita

BY Cushman, Darby & Cushman

ATTORNEYS

APPARATUS FOR AUTOMATICALLY RUNNING AUTOMOTIVE VEHICLES AT A SET SPEED

BACKGROUND OF THE INVENTION

1. Field of the Invention

The present invention relates generally to an apparatus for running an automotive vehicle at a set speed and more particularly to such an apparatus for running an automotive vehicle at a set speed which is so designed that the speed of the vehicle running at the set speed under an automatic speed control system can be accelerated or decelerated temporarily optionally without releasing said control system.

2. Description of the Prior Art

With conventional apparatus for automatically running an automotive vehicle at a set speed, as is well known, a speed of the vehicle desired by the driver is obtained by setting a speed setting device at the desired speed.

However, such conventional apparatus have the drawback that the use of the apparatus is troublesome when the road on which the automotive vehicle is travelling is crowded, because when the speed of the automotive vehicle, running at a constant speed under the control of the apparatus, need be decelerated or accelerated temporarily by reason of the road condition or other vehicles interfering with the constant speed travelling of said automotive vehicle, the driver is required to temporarily release the functioning of the apparatus or to change the speed setting and further some other operation is required for restoring the functioning of the apparatus or for restoring the set speed at which the automotive vehicle had been running before the deceleration or acceleration was effected.

SUMMARY OF THE INVENTION

The object of the present invention is to provide an apparatus for automatically running an automotive vehicle at a set speed, which includes two self-restoring switches provided in the driver's cabin, one of said switches being inserted in an electric control circuit in such a manner that in a closed position of the switch a signal is given to the speed control system, which always causes the speed of the vehicle to be apparently lower than the set speed independently of the actual speed of the vehicle and the set speed, and another one of said switches being inserted in the electric control circuit in such a manner that in a closed position of the switch a signal is given to the speed control system, which always causes the speed of the vehicle to be apparently higher than the set speed independently of the actual speed of the vehicle and the set speed.

According to the present invention, there is brought about the advantage that the speed of the automotive vehicle, running at a fixed speed, can be accelerated or decelerated temporarily optionally without releasing the speed control system and no operation is required for restoring the fixed running speed after acceleration or deceleration. Thus, it will be appreciated that by employing the present apparatus the automotive vehicle can be operated with much ease even on a relatively crowded road on which an automotive vehicle equipped with the conventional apparatus for automatically running automotive vehicles at a set speed cannot be operated under the control of said apparatus. The present invention, therefore, is of great practical advantage.

DESCRIPTION OF THE PREFERRED EMBODIMENTS

The present invention will be more fully understood from the following detailed description taken in conjunction with the accompanying drawings.

Figure 1:
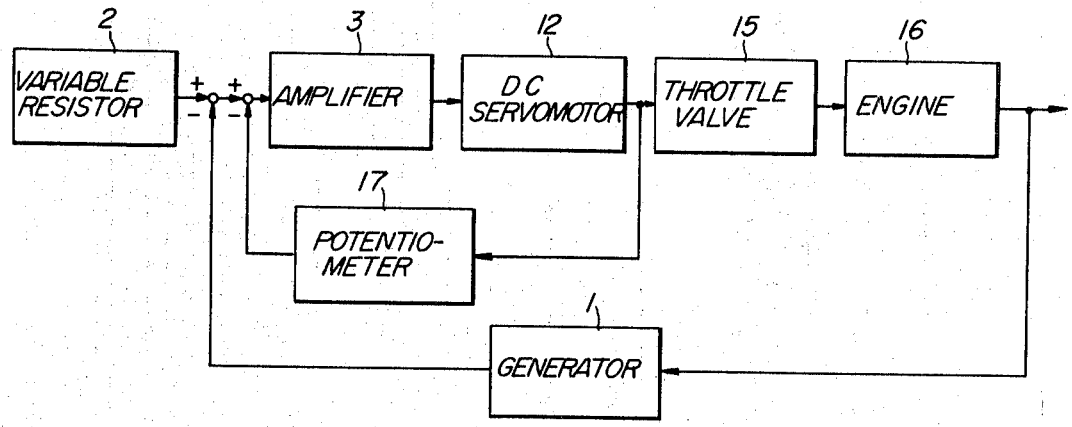
FIG. 1 is a block diagram briefly showing the structure of the apparatus for automatically running an automotive vehicle at a set speed according to the present invention.
Figure 2:
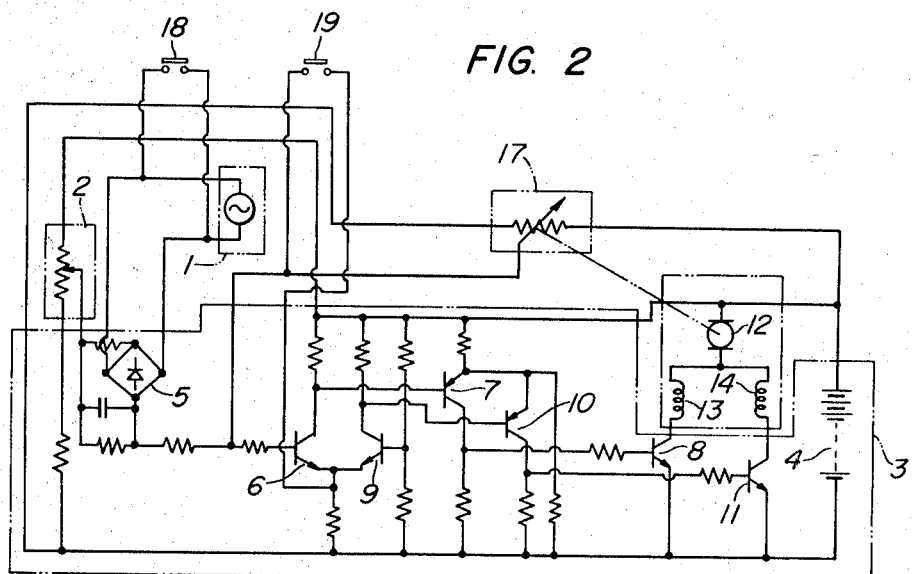
FIG. 2 is an electrical connection diagram of an embodiment of this invention.

Referring to FIGS. 1 and 2, reference numeral 1 designates a generator for detecting the speed of the vehicle, 2 a variable resistor for setting the speed of the vehicle, 3 an amplifier, 4 a storage battery, 5 a full-wave rectifier with a diode bridged thereto, and 6, 7, 8, 9, 10 and 11 transistors of which the transistors 6 and 9 form a differential amplifier circuit, and the transistors 6, 7, 8 and the transistors 9, 10, 11 form a series of amplifier circuit respectively. Reference numeral 12 designates a direct current servomotor and two field windings 13, 14 connected to the output terminals of the aforesaid amplifier 3 are wound in opposite sense to each other. Reference numeral 15 designates a throttle valve of a carburetor provided on an internal combustion engine 16, and 17 designates a potentiometer which forms a negative feedback circuit for stabilizing the control system. Reference numerals 18, 19 designate self-restoring switches which are held in a closed position only for a period when they are depressed forcibly. One of the switches 18 is inserted across the output terminals of the vehicle speed detecting generator 1, while another one 19 is inserted across the output terminal of the potentiometer 17, connected to the base of the transistor 6, and the emitter of said transistor 6.

The apparatus of the structure described above will operate in the following manner: Namely, when the output voltage of the vehicle speed detecting generator 1, driven by the internal combustion engine 16, is higher than the output voltage of the variable resistor 2 for setting the vehicle speed, that is, when the speed of the vehicle is higher than the set speed, the transistor 6 tends to be deenergized due to its base current decreasing, so that the transistor 9, forming the differential amplifier circuit with said transistor 6, tends to be energized. Consequently, the transistors 10, 11, forming the amplifier circuit together with the transistor 9, are energized conducting a current through the field winding 14 of the direct current servomotor 12. As a result, the servomotor 12 turns in a direction to close the throttle valve 15 of the carburetor and thus the running speed of the at automotive vehicle is reduced. Accordingly, the output voltage of the vehicle speed detecting generator 1 becomes low and approaches the output voltage of the vehicle speed setting variable resistor 2. In this case, the movable contactor of the potentiometer 17, which is connected to the rotary shaft of the servomotor 12, is displaced to cause a negative feedback of the output voltage of said potentiometer 17 to the input side of the transistor 6, so that a drop of the output of the vehicle speed detecting generator 1 below the output of the vehicle speed setting variable resistor 2, caused by the inertial movement of the servomotor 12, can be compensated. Therefore, the throttle valve 15 of the carburetor is opened to a degree corresponding to the differential between the output voltage of the generator 1 and the output voltage of the variable resistor 2, and the control system becomes stabilized at a point where the output voltage of the generator 1 is equal to the output voltage of the variable resistor 2. On the other hand, when the output voltage of the generator 1 is lower than the output voltage of the variable resistor 2, that is, when the speed of the vehicle is lower than the set speed, transistor 6 tends to be energized with the base current thereof increasing, so that the transistor 9, forming the differential amplifier circuit with said transistor 6, tends to be deenergized. Consequently, the transistors 7, 8, forming the amplifier circuit with said transistor 6, are energized. A current flows through the field winding 13 of the direct current servomotor 12, causing said servomotor 12 to turn in a direction to open the throttle valve 15 of the carburetor, and thus the running speed of the automotive vehicle increases. As a result, the output voltage of the vehicle speed detecting generator 1 rises to approach the output voltage of the vehicle speed setting variable resistor 2. In this case, the movable contactor of the potentiometer 17, which is connected to the rotary shaft of the servomotor 12, a displaced, causing a negative feedback of the output voltage of said potentiometer to the input side of the transistor 6. Therefore, the output voltage of the generator 1 is prevented from becoming excessively high, and the throttle valve 15 of the carburetor is opened to a degree corresponding to the differential between the output voltage of the generator 1 and the output voltage of the variable resistor 2. The control system becomes stabilized at a point where the output voltage of the generator 1 and the output voltage of the variable resistor 2 are balanced.

Next, when the speed of the automotive vehicle is desired to be accelerated temporarily during travelling at a fixed speed, the switch 18 is closed, whereby both output terminals of the vehicle speed detecting generator 1 are shorted and the output voltage of the generator 1 to the control system becomes apparently zero. This corresponds to the case wherein the output voltage of the generator 1 is lower than the output voltage of the variable resistor 2. Namely, the direct current servomotor 12 turns in a direction to open the throttle valve 15 of the carburetor. The servomotor 12 operates the throttle valve 15 always in an opening direction throughout the period when the switch 18 is maintained closed, so that the speed of the vehicle can be accelerated as desired. By removing the pressure from the switch 18, the running speed of the vehicle returns to the original set speed without requiring any action of the driver. On the other hand, when the speed of the vehicle is desired to be decelerated during travelling at the set speed, the switch 19 is closed, whereby the base and the emitter of the transistor 6 are shorted, with the result that said transistor 6 is deenergized independently of the speed of the vehicle and the value of set speed. This corresponds to the case wherein the output voltage of the vehicle speed detecting generator 1 is higher than the output voltage of the vehicle speed setting variable resistor 2, and thus the direct current servomotor 12 turns in a direction to close the throttle valve 15 of the carburetor. Since the direct current servomotor 12 operates the throttle valve 15 always in a closing direction throughout the period when the switch 19 is maintained closed, the speed of the vehicle can be decelerated as desired. The running speed of the vehicle returns to the initially set speed upon removing the pressure from the switch 19, without requiring any action of the driver.

We claim:
1. An apparatus for automatically running an automotive vehicle at a set speed, wherein the vehicle's speed is regulated by a throttle valve, said apparatus comprising:
   a generator for detecting the actual speed of said automotive vehicle and for producing a corresponding running speed signal at output terminals of said generator;
   a running speed setting circuit for producing a signal for setting the desired speed of said automotive vehicle;
   a servomechanism for regulating the positioning of said throttle valve;
   a differential amplifier for controlling the operation of said servomechanism by comparing the actual running speed signal from said generator with the desired speed signal from said running speed setting circuit;
   a feed back circuit for producing an output signal corresponding to the position of said servomechanism and for feeding said output signal back to an input of said differential amplifier;
   an accelerating switch for stopping said signal from said generator whenever it is desired to increase the speed of said automotive vehicle; and
   a decelerating switch for stopping an input to said differential amplifier whenever it is desired to decrease the speed of said automotive vehicle.

2. An apparatus as claimed in claim 1 wherein said accelerating switch comprises normally open contacts connected between said comprises normally open contacts connected between said output terminals of said generator.

3. An apparatus as claimed in claim 1 wherein: said differential amplifier circuit comprises two transistors connected in a common emitter configuration, and said decelerating switch has normally open contacts connected between the commonly connected emitters and one of the bases of said transistors.